(12) United States Patent
Kataoka et al.

(10) Patent No.: US 8,493,307 B2
(45) Date of Patent: Jul. 23, 2013

(54) DISPLAY DEVICE

(75) Inventors: Noboru Kataoka, Oamishirasato (JP); Fumiaki Komori, Isumi (JP); Takashi Watanabe, Kokubunji (JP); Futoshi Furuta, Kokubunji (JP); Hiroshi Kageyama, Hachioji (JP)

(73) Assignees: Hitachi Displays, Ltd., Chiba-ken (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 708 days.

(21) Appl. No.: 12/314,846

(22) Filed: Dec. 17, 2008

(65) Prior Publication Data

US 2009/0160829 A1    Jun. 25, 2009

(30) Foreign Application Priority Data

Dec. 21, 2007    (JP) .................. 2007-329501

(51) Int. Cl.
*G09G 3/36* (2006.01)

(52) U.S. Cl.
USPC ............... 345/98; 345/100; 345/204; 345/92; 348/518; 348/524; 348/537

(58) Field of Classification Search
USPC ........ 345/204, 87, 100, 92, 98; 708/250–256; 348/51–61, 518.524, 537, E3.015
See application file for complete search history.

(56) References Cited

U.S. PATENT DOCUMENTS

| | | | | |
|---|---|---|---|---|
| 4,078,255 A | * | 3/1978 | Evans | 708/256 |
| 6,552,702 B1 | * | 4/2003 | Abe et al. | 345/75.2 |
| 7,411,993 B2 | * | 8/2008 | Sunaga et al. | 375/130 |
| 2004/0046727 A1 | * | 3/2004 | Fujioka et al. | 345/98 |
| 2004/0227714 A1 | * | 11/2004 | Furuichi | 345/98 |
| 2005/0213759 A1 | * | 9/2005 | Tsuchida | 380/210 |
| 2007/0046650 A1 | * | 3/2007 | Lee et al. | 345/173 |
| 2007/0176949 A1 | * | 8/2007 | Chang et al. | 345/690 |
| 2008/0136799 A1 | * | 6/2008 | Nakamura | 345/204 |
| 2009/0015562 A1 | * | 1/2009 | Yasukawa | 345/173 |
| 2009/0147089 A1 | * | 6/2009 | Tonkikh | 348/207.99 |

FOREIGN PATENT DOCUMENTS

JP    06-051957    2/1994

OTHER PUBLICATIONS

Sadahiko Yasukawa, Jun. 9, 2005, "Display System", PCT/JP2004/013815, WO 2005/052782.*

* cited by examiner

*Primary Examiner* — Lun-Yi Lao
*Assistant Examiner* — Md Saiful A Siddiqui
(74) *Attorney, Agent, or Firm* — Stites & Harbison PLLC; Juan Carlos A. Marquez

(57) ABSTRACT

To realize a random number generating circuit that is optimum for a liquid crystal display device that is used in a terminal device that includes a display/input component. A liquid crystal display device includes a liquid crystal display panel, a control circuit and a random number generating circuit, the random number generating circuit comprises plural shift registers, an output circuit and a register that stores an initial value, and the random number generating circuit is equipped with plural initial values, whereby the randomness of the random numbers is improved. Further, it becomes possible to increase and output frequencies by the output circuit because it is possible to output respectively different random numbers from the plural shift registers.

14 Claims, 16 Drawing Sheets

Shift Register Initial Values: 1, 0, 0, 0, 0, 0, 0, 0

T1, T6

Time →

Shift Register Initial Values: 0, 1, 0, 1, 0, 1, 0, 0

Time →

DISPLAY DEVICE

BACKGROUND OF THE INVENTION

1. Field of the Invention

The present invention relates to a display device and particularly to a technology that is effective for a random number generating circuit that is used in a display device.

2. Description of the Related Art

Thin film transistor (TFT) liquid crystal display devices that include medium-sized liquid crystal display panels are widely used as display portions in portable terminals and laptop personal computers.

Among these medium-sized liquid crystal display devices, there are devices that are also disposed with a touch panel as an input device for data that are inputted from the outside. Further, keyboards that have conventionally been used are also used as external input devices.

There are cases where, in order to maintain confidentiality, coding such as encryption is administered to data that have been inputted from these input devices. Random numbers are usually used for the coding, and a need has arisen for display devices to also be equipped with a random number generating circuit.

However, conventional display devices are not equipped with a random number generating circuit, and random number generating devices that are optimum for general-purpose display devices are being tried.

Meanwhile, various random number generating circuits have conventionally been proposed, and in JP-A-06-051957, there is description of a circuit that generates random numbers called M-sequences in shift registers. However, in JP-A-06-051957, there is no description in regard to a random number generating circuit that is used in a display device.

SUMMARY OF THE INVENTION

In the aforementioned display devices, when a random number generating circuit with high randomness is used, problems arise in that the circuit scale becomes larger, material costs rise, and securement of an installation area is difficult.

Further, in display devices, there is also a demand to suppress voltage changes of a signal that is outputted from the circuit in order to counter electromagnetic wave noise (EMI). There has also arisen the problem that electromagnetic wave noise increases because voltage changes are frequent due to the characteristic that, when random numbers are generated from a random number generating circuit, the randomness thereof is high.

The present invention has been made in order to address the aforementioned problems, and it is an object thereof to provide a technology where an optimum random number generating circuit is used in a display device, circuit scale is suppressed, and a measure to counter electromagnetic wave noise also becomes possible.

The foregoing and other objects and novel features of the invention will be made apparent by the description of the present specification and the attached drawings.

To briefly describe an overview of a representative invention of the inventions disclosed in the present application, it is as follows.

A display device includes: a display panel; a drive circuit that drives each pixel of the display panel; and a control circuit that outputs display data to the drive circuit, wherein a random number generating circuit is disposed in the control circuit. The random number generating circuit includes n number of shift register circuits, and output signals of the n number of shift register circuits are inputted to an output circuit. In the output circuit, an output signal of a frequency of n times is generated from the output signals of the n number of shift register circuits.

By disposing the n number of shift register circuits, the randomness of the random numbers that are generated from the random number generating circuit improves. Further, by using the n number of shift register circuits, it is possible to also generate signals of a frequency of n times as the random numbers.

DETAILED DESCRIPTION OF THE EMBODIMENT

Figure 1:
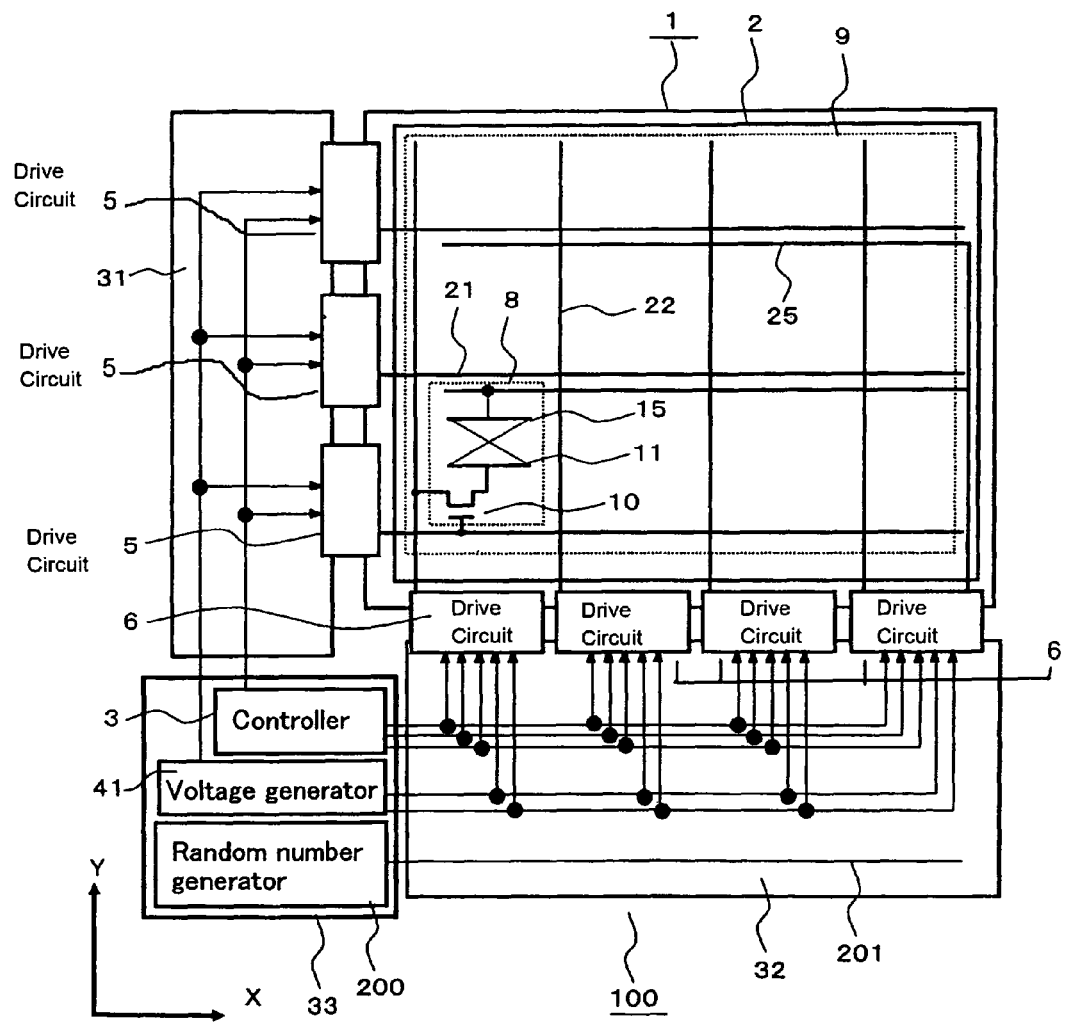
FIG. 1 is a block diagram showing the general configuration of a liquid crystal display device of the invention.

Below, an embodiment of the present invention will be described in detail with reference to the drawings.

It will be noted that, in all of the drawings for describing the embodiment, the same reference numerals will be given to members that have the same functions, and redundant description thereof will be omitted.

FIG. 1 is a block diagram showing the general configuration of a liquid crystal display device 100 that is one embodiment of the present invention. As shown in FIG. 1, the liquid crystal display device 100 is configured by a liquid crystal display panel 1, a scanning line circuit board 31, a video signal circuit board 32 and a control circuit board 33.

The liquid crystal display panel 1 is configured by a TFT substrate 2 and a filter substrate (not shown) that are superposed such that there is a predetermined distance therebetween. Both substrates are adhered together by a seal material (not shown) that is disposed in a frame-like shape on their peripheral edge portions. A liquid crystal composition is enclosed and sealed inside the seal member. Moreover, a polarizing plate is adhered to the outside of both substrates.

It will be noted that the present embodiment is applied in the same manner to a so-called in-plane switching mode liquid crystal display panel where opposing electrodes 15 are disposed on the TFT substrate 2 and to a so-called vertical electric field mode liquid crystal display panel where opposing electrodes 15 are disposed on the filter substrate.

In FIG. 1, there are disposed scanning signal lines (also called gate signal lines) 21 that extend in an x direction in the drawing and are disposed adjacent to each other in a y direction and video signal lines (also called drain signal lines) 22 that extend in the y direction and are disposed adjacent to each other in the x direction, and pixel components 8 are formed in regions that are enclosed by the scanning signal lines 21 and the video signal lines 22.

It will be noted that, although the liquid crystal display panel 1 is disposed with numerous pixel components 8 in a matrix, FIG. 1 shows just one of the pixel components 8 in order to make the drawing easier to understand. The pixel components 8 that are arranged in a matrix form a display region 9, and each of the pixel components 8 fulfills the role of a pixel of a display image and displays an image in the display region 9.

In each of the pixel components 8, a source of a thin film transistor 10 is connected to a pixel electrode 11, a drain of the thin film transistor 10 is connected to the video signal line 22, and a gate of the thin film transistor 10 is connected to the scanning signal line 21. The thin film transistor 10 functions as a switch for supplying a display voltage (gradation voltage) to the pixel electrode 11.

It will be noted that, although the names "source" and "drain" are sometimes reversed because of the relationship of bias, here, that which is connected to the video signal line 22 is called a drain.

The video signal lines 22 are connected to drive circuits 6, and video signals are supplied from the drive circuits 6. The scanning signal lines 21 are connected to drive circuits 5, and scanning signals are supplied from the drive circuits 5.

The drive circuits 5 are connected to the scanning line circuit board 31, control signals are supplied from the control circuit 3 via the scanning line circuit board 31, and a power voltage is supplied from a power circuit 41.

The drive circuits 6 are connected to the video signal line circuit board 32, control signals are supplied from the control circuit 3 via the video signal line circuit board 32, and a power voltage is supplied from the power circuit 41.

The control circuit 3 and the power circuit 41 are disposed on the control circuit board 33. A random number generating circuit 200 is disposed on the control circuit board 33, and random numbers are generated from the random number generating circuit 200. A transmission line 201 is connected to the random number generating circuit 200, and signals from the random number generating circuit 200 are transmitted by the transmission line 201 to the video signal line circuit board 32 and the like. It will be noted that the details of the random number generating circuit 200 will be described later.

Figure 2:
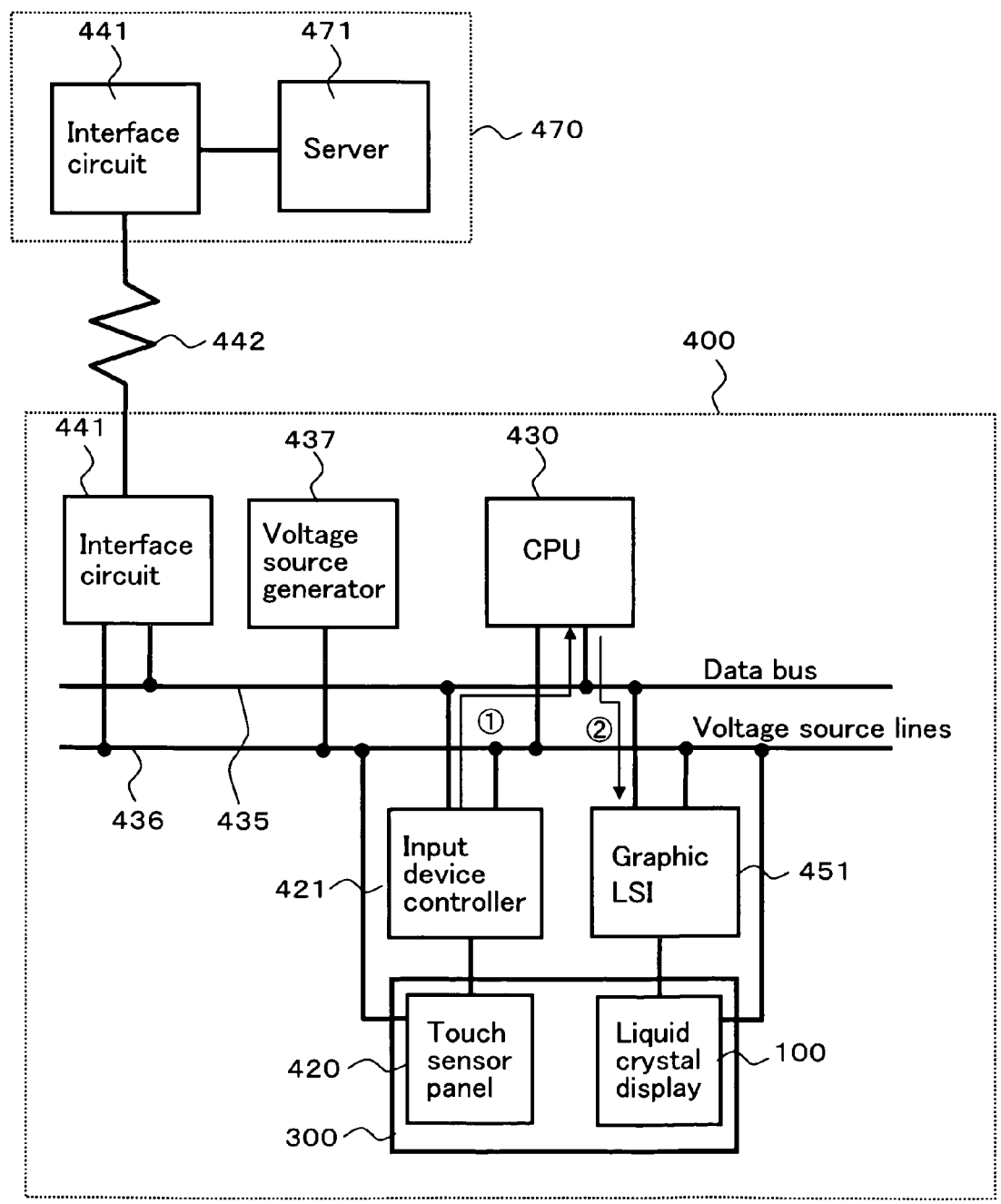
FIG. 2 is a block diagram showing the general configuration of a terminal device to which the liquid crystal display device of the invention is applied.

Next, a terminal device 400 to which the liquid crystal display device 100 is applied will be described using FIG. 2. The liquid crystal display device 100 is used as a display portion in the terminal device 400. A touch sensor panel 420 is disposed together with the liquid crystal display device 100, and a display/input component 300 is formed by the liquid crystal display panel 100 and the touch sensor panel 420.

Figure 3:
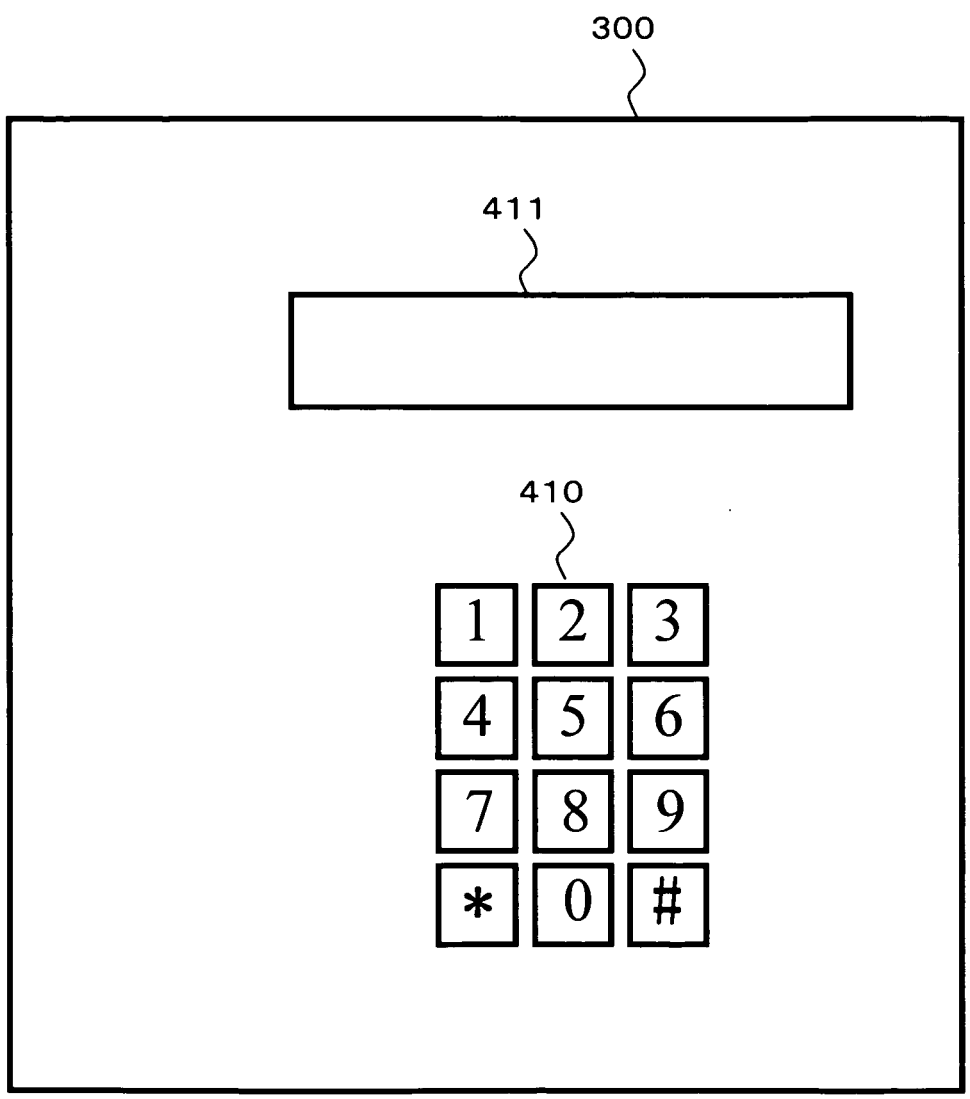
FIG. 3 is a front diagram showing the general contour of a display/input component of the terminal device to which the liquid crystal display device of the invention is applied.

FIG. 3 shows a general front view of the display/input component 300. The display/input component 300 shows touch input portions 410 to a user of the terminal device 400 and displays information that has been inputted on a display portion 411.

The user touches the touch input portions 410 with a fingertip or the like, whereby the user inputs data based on information displayed in touched positions to the terminal device 400. The data that have been inputted are processed by the terminal device 400 and are displayed for verification also on the display portion 411.

It will be noted that, in the case of data whose confidentiality is high, processing such as encryption processing is administered to the data that have been inputted. Further, the actual data are not displayed on the display portion 411, but an asterisk or the like, for example, is displayed on the display portion 411.

Position data that have been inputted from the touch sensor panel 420 are first transmitted to an input device control circuit 421, are data-processed, and are transferred to a CPU 430 via a data bus 435.

In the CPU 430, necessary processing is selected and executed with respect to the input data. With respect to the liquid crystal display device 100, display content is selected on the basis of the input data and is transmitted to a graphic integrated circuit 451 via the data bus 435.

In the graphic integrated circuit 451, processing that is necessary for image display is performed, and the graphic integrated circuit 451 outputs display data with respect to the liquid crystal display device 100. At this time, when encryption processing or the like is being administered to the display data, the random number generating circuit 200 becomes necessary also in the liquid crystal display device 100.

The terminal device 400 is particularly equipped with an external communication interface circuit 441 and performs data exchange with a remote central processor 470 utilizing a communication line 442 such as a LAN, so encryption processing or the like becomes essential. The central processor 470 is, for example, configured by an external communication interface circuit 441 and a server 471. It will be noted that reference numeral 437 is a power circuit of the terminal device 400 and that reference numeral 436 is a power voltage line.

Next, the display/input component 300 will be described using FIG. 3. The display/input component 300 is formed as a result of the liquid crystal display device 100 and the touch sensor panel 420 being planarly superposed. FIG. 3 shows the display/input component 300 as seen by the user and does not show a distinction between the liquid crystal display device and the touch sensor panel 420.

The display/input component 300 uses the liquid crystal display device 100 and displays the touch input portions 410 so as to prompt input. The user inputs data by touching the touch input portions 410 with a fingertip or the like.

The touch sensor panel 420 transmits the position information that the user has touched to the terminal device via the input device control circuit 421. The terminal device 400 judges the input data on the basis of the position information from the touch sensor panel 420.

That is, in the display/input component 300, the position information comes to have important meaning, and the display/input component 300 comes to be equipped with a function as an input device in addition to a display image. It will be noted that, when the user touches the touch input portions 410, sometimes display of the region that shows the input data changes such that input operation can be verified.

For example, when the user touches the inside of the square frame that encloses the number "2" of the touch input portions 410, the tone of the square that encloses the number "2" inverts, or the background color changes.

Figure 4:
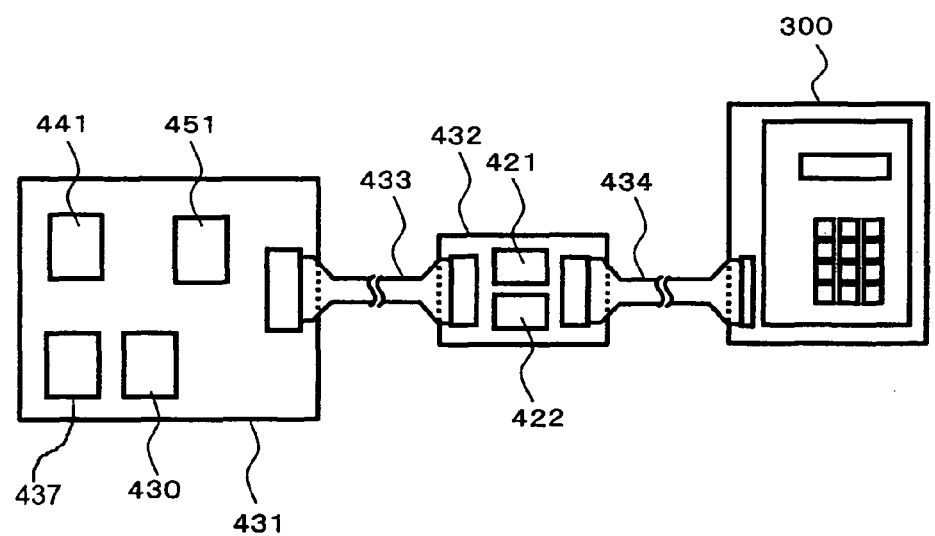
FIG. 4 is a block diagram showing the general mounting configuration of the terminal device to which the liquid crystal display device of the invention is applied.
Figure 5:
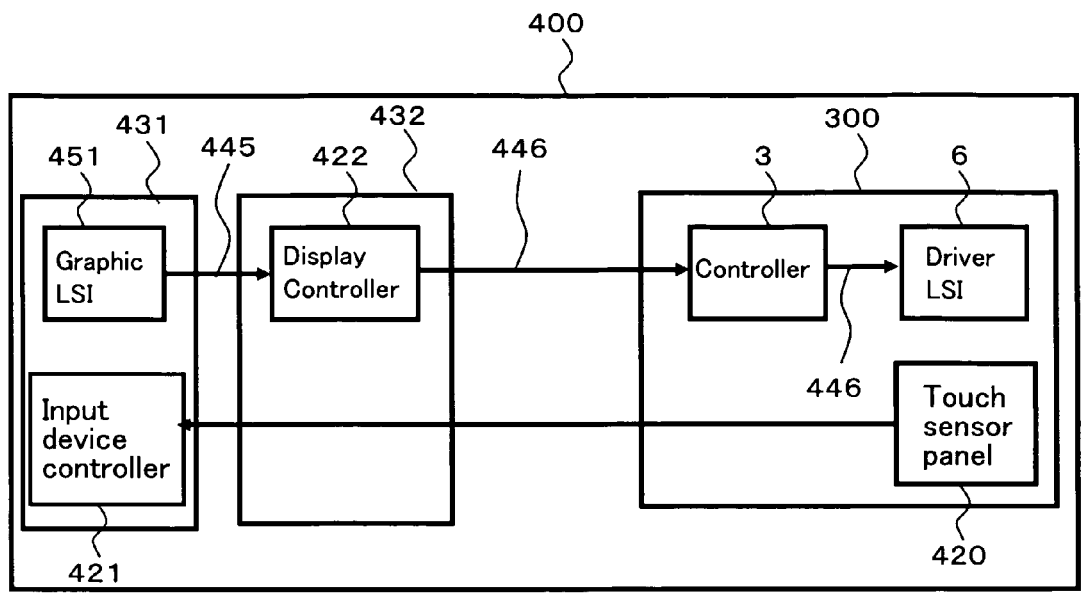
FIG. 5 is a block diagram showing a transmission path of a signal of the terminal device to which the liquid crystal display device of the invention is applied.

Next, FIG. 4 shows an embodiment of the display/input component 300. The display/input component 300 is mounted away from a main board 431 of the terminal device 400 so as to face the user. Further, there are also cases where the display/input component 300 is mounted such that an input/output board 432 is disposed in between, the main board 431 and the input/output board 432 are interconnected by a cable 433, and the input/output board 432 and the display/input component 300 are interconnected by a cable 434.

The input device control circuit 421 and a display control device 422 are disposed on the input/output board 432. The display control device 422 is disposed in order to impart versatility to the liquid crystal display device 100 so that, for example, the liquid crystal display device 100 is capable of handling analog signal input and digital signal input because of the display control device 422.

Further, because there are differences resulting from specifications in digital signals also, the display control device 422 performs processing for delivering the display data that the graphic integrated circuit 451 outputs to the control circuit 3 of the liquid crystal display device 100. Further, the display control device 422 is also capable of outputting a low voltage differential signal for the liquid crystal display device 100.

Signals that are transmitted between the main board 431 and the display/input component 300 will be described using FIG. 5 to FIG. 8. Inside the main board 431, data transfer is performed via the data bus 435, but the graphic integrated circuit 451 outputs a display data specification signal 445 to the display control device 422.

The signal 445 that is outputted from the graphic integrated circuit 451 is a digital signal that usually oscillates by 3 V to 5 V and is an 8- to 32-bit parallel signal. Thus, noise that is generated by the signal 445 becomes a problem, so attention to line design is necessary.

Next, a digital signal 446 is outputted from the display control device 422 to the control circuit 3 of the liquid crystal display device 100. The digital signal 446 also oscillates by 3 V to 5 V and is an 8- to 64-bit parallel signal. Thus, noise that is generated by the signal 446 becomes a problem, so attention to line design is necessary.

Further, the digital signal 446 is outputted also between the control circuit 3 and the drive circuits 6 or the drive circuits 5. These digital signals 446 are transmitted via the aforementioned video signal line circuit board 32 and scanning line circuit board 31.

Figure 6:
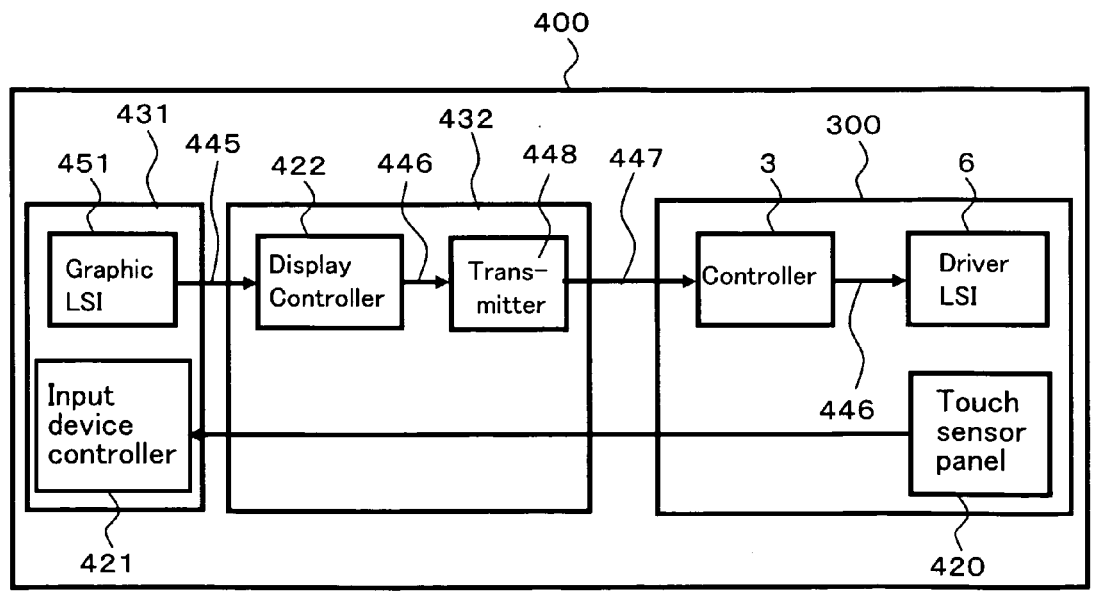
FIG. 6 is a block diagram showing a transmission path of a signal of the terminal device to which the liquid crystal display device of the invention is applied.

FIG. 6 shows a case where a low voltage differential signal 447 is outputted from the input/output board 432. The output from the display control device 422 is converted to the low voltage differential signal 447 by a transmitter 448.

The low voltage differential signal 447 is effective for an EMI countermeasure, so the noise that is generated is smaller than that of the digital signal 446 and the like, but depending on the case, a noise countermeasure becomes necessary also for the low voltage differential signal 447.

It will be noted that, in the case of FIG. 6 also, the digital signal 446 is transmitted between the display control device 422 and the transmitter 448, and a noise countermeasure becomes necessary between the display control device 422 and the transmitter 448.

Figure 7:
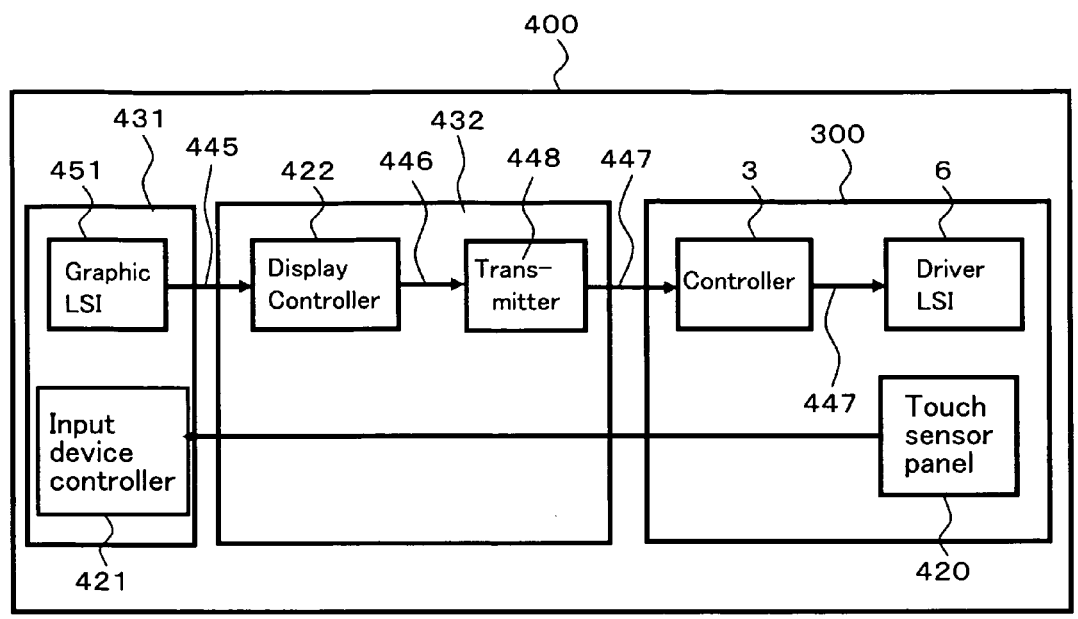
FIG. 7 is a block diagram showing a transmission path of a signal of the terminal device to which the liquid crystal display device of the invention is applied.

Next, FIG. 7 shows a case where the low voltage differential signal 447 is outputted from the input/output board 432 and the low voltage differential signal 447 is outputted also from the control circuit 3. A signal is supplied by the low voltage differential signal 447 that is effective for an EMI countermeasure also on the video signal line circuit board 32 and the scanning line circuit board 31, and noise is reduced.

It will be noted that, inside the control circuit 3, signals are processed by digital signals, so inside the control circuit 3, when a signal is converted from the low voltage differential signal 447 into a digital signal and is outputted from the control circuit 3, the signal is converted into the low voltage differential signal 447 for the video signal line circuit board 32 and the scanning line circuit board 31.

Figure 8:
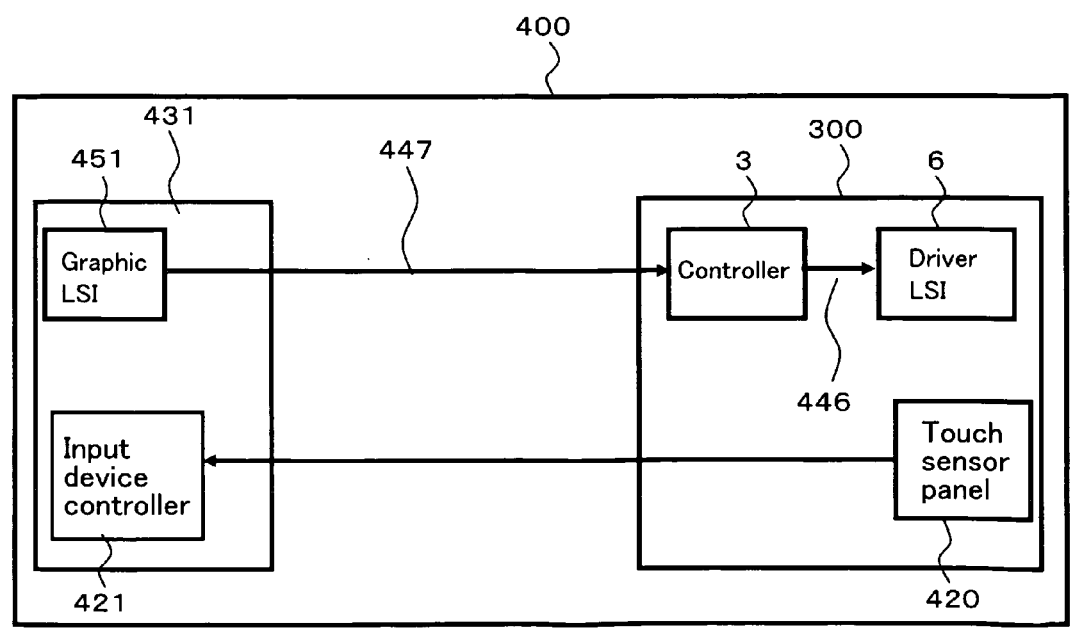
FIG. 8 is a block diagram showing a transmission path of a signal of the terminal device to which the liquid crystal display device of the invention is applied.

FIG. 8 shows a case where the function of the display control device 422 is included in the graphic integrated circuit 451. In FIG. 8, the low voltage differential signal 447 is outputted to the control circuit 3 directly from the graphic integrated circuit 451. In this case, the generation of noise is suppressed between the graphic integrated circuit 451 and the control circuit 3. However, when the digital signal 446 is being outputted between the control circuit 3 and the drive circuits 6 or the drive circuits 5, a noise countermeasure from the control circuit 3 on becomes necessary.

Next, the random number generating circuit 200 will be described using FIG. 9. Reference numeral 210 represents initial value holding circuits, reference numeral 220 represents shift register circuits, and reference numeral 230 represents an output circuit.

The shift register circuits 220 return final stage values to initial stages by return paths 221 and generate random numbers. As described later, the shift register circuits 220 generate random numbers by retrieving a value from middle stages, calculating the exclusive OR and the values of the return paths 221, and returning those calculation results to the initial stages.

Figure 9:
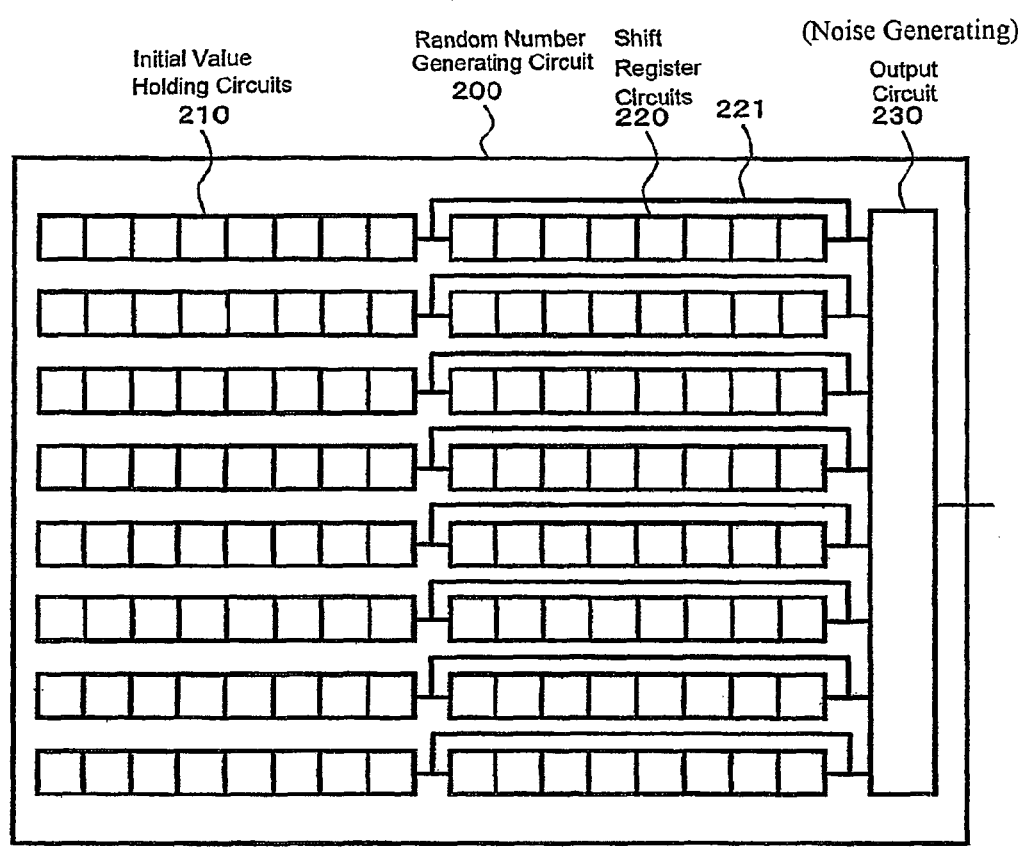
FIG. 9 is a block diagram showing a random number generating circuit that is used in the liquid crystal display device of the invention.

The shift register circuits 220 are capable of generating random numbers on their own; in FIG. 9, eight shift register circuits 220 are disposed in parallel, the output of each of the shift register circuits 220 is inputted to the output circuit 230, and random numbers are outputted from the output circuit 230.

Further, in order to set respectively different initial values of the eight shift register circuits 220, eight registers 210 are prepared, and different initial values are stored in each of the registers 210. The shift registers 220 are capable of generating random numbers of different patterns by reading the different initial values from the registers 210 at the time when the operation is initiated.

Figure 10:
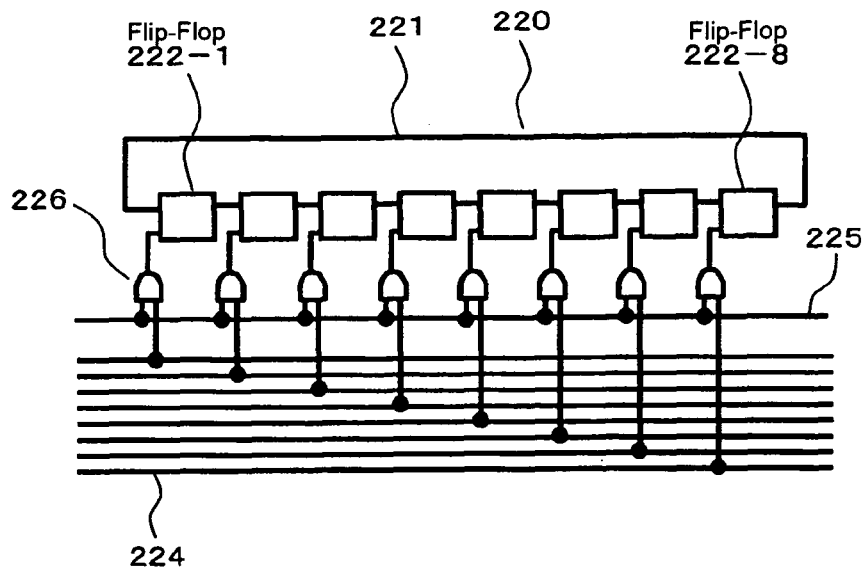
FIG. 10 is a general circuit diagram showing the random number generating circuit that is used in the liquid crystal display device of the invention.

FIG. 10 shows an initial value transfer method. Initial values that are transferred by initial value transfer lines 224 are stored in each flip-flop 222 via AND circuits 226 as a result of an initial value transfer control signal line 225 becoming high. It will be noted that flip-flop 222-1 represents an initial stage flip-flop and that flip-flop 222-8 represents a final stage flip-flop.

Figure 11:
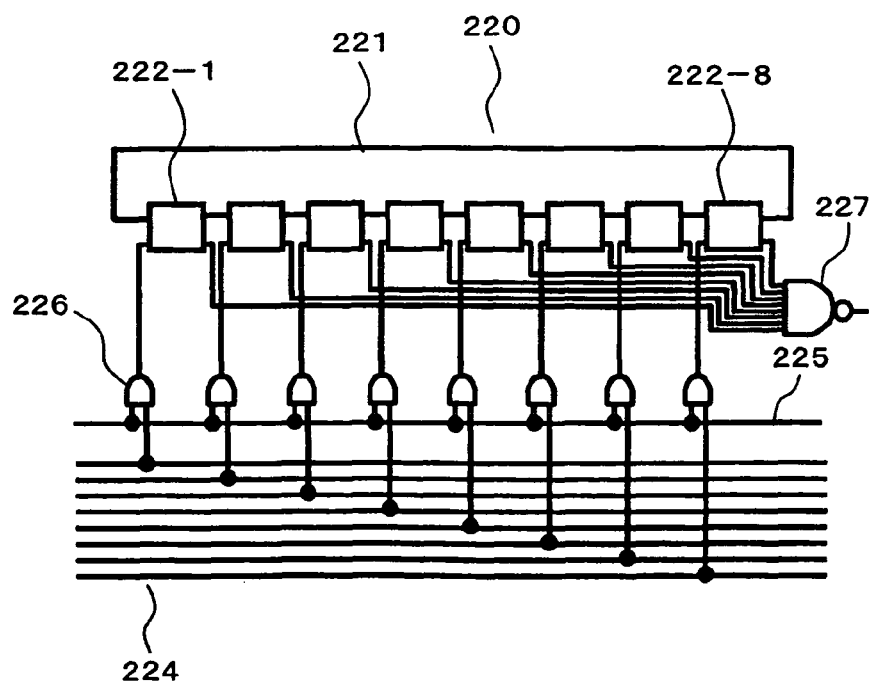
FIG. 11 is a general circuit diagram showing the random number generating circuit that is used in the liquid crystal display device of the invention.

FIG. 11 shows a configuration where an initial value determining circuit 227 is added. The shift registers 220 cannot generate random numbers in a case where the initial values of all of the flip-flops 222 are 0, so the initial value determining circuit 227 is used to determine whether all of the flip-flops 222 are 0.

Figure 12A:
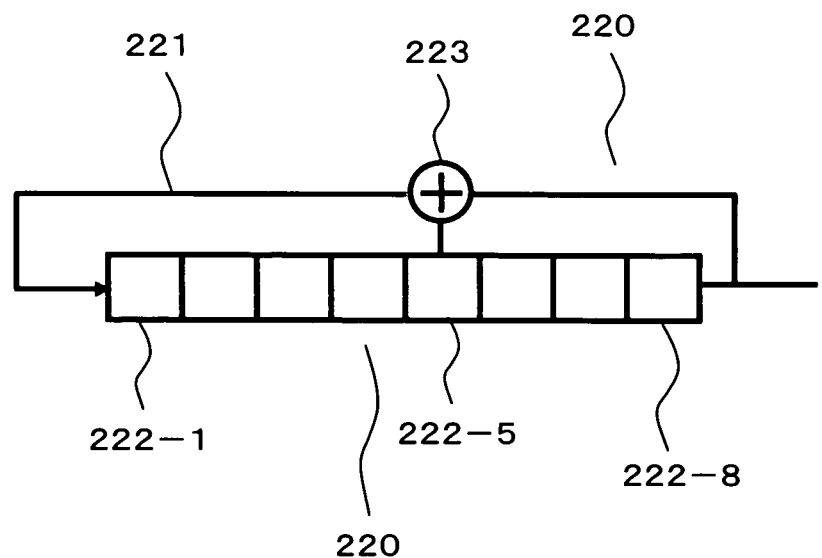
FIG. 12A and FIG. 12B are general circuit diagrams showing the random number generating circuit that is used in the liquid crystal display device of the invention.

Next, the return paths 221 of the shift registers 220 will be described. In FIG. 12A, the output of the final stage flip-flop 222-8 and the output of the fifth stage flip-flop 222-5 are calculated by an exclusive OR circuit 223, and the result thereof is inputted to the initial stage flip-flop 222-1, whereby a random number is generated.

Figure 13A:
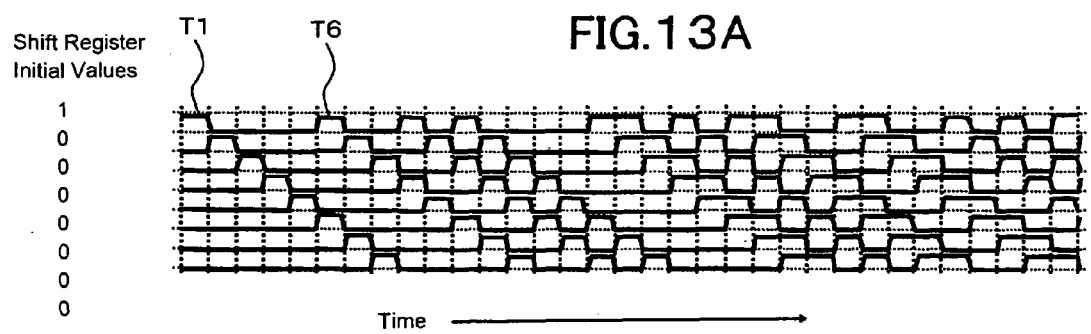
FIG. 13A and FIG. 13B are time charts showing output waveforms of the random number generating circuit that is used in the liquid crystal display device of the invention.

FIG. 13A shows a pattern that the random numbers generate when their initial values (1, 0, 0, 0, 0, 0, 0, 0) are set. At time T1, a value of "1" is held in the initial stage flip-flop 222-1. Next, in synchronization with a basic clock, the value "1" that was held in the flip-flop 222-1 is transferred to the next stage flip-flop. It will be noted that, for the basic clock that is used in the transfer between the flip-flops, it is also possible to use a clock that transfers the display data.

At time T6, when the value "1" is held in the fifth stage flip-flop 222-5, the exclusive OR is calculated between that and the value "0" that the final stage flip-flop 222-8 holds, and the calculation result of "1" is held in the initial stage flip-flop 222-1. Below, similarly, in synchronization with the basic clock, values are transferred between the flip-flops 222.

When the random number generating circuit 200 is formed using m stages of shift registers 200, it is possible to generate random numbers in periods of ($2^m-1$).

Figure 12B:
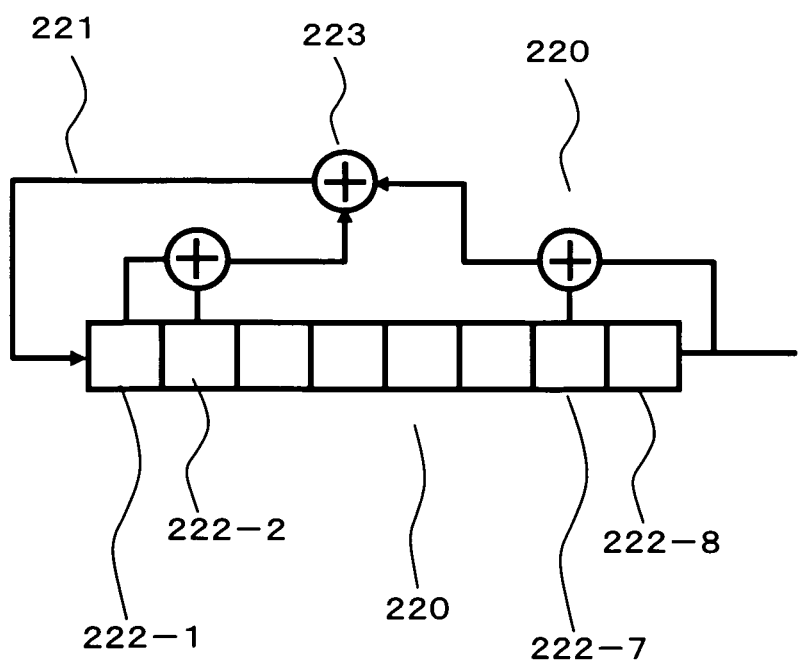

FIG. 12B shows a shift register circuit 220 that creates a first calculation result of the exclusive OR of the initial stage flip-flop 222-1 and the second stage flip-flop 222-2 and a second calculation result of the exclusive OR of the final stage flip-flop 222-8 and the flip-flop 222-7 that is one stage before the final stage and inputs to the initial stage a third calculation result where the exclusive OR is further calculated between the first and second calculation results.

Figure 13B:
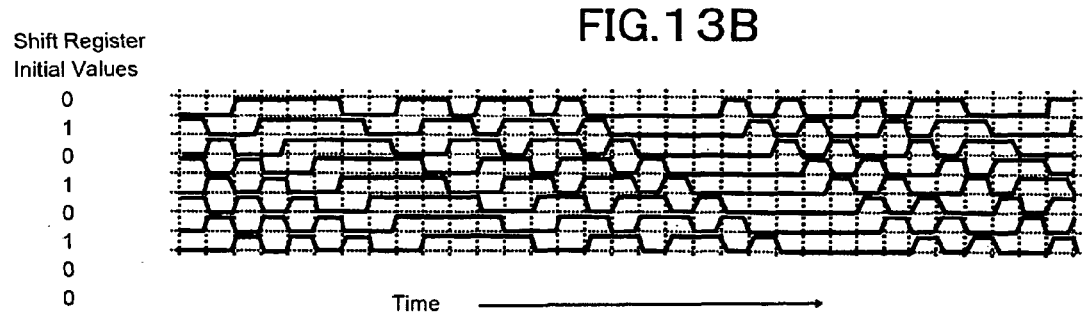

Next, the initial values will be described using FIG. 13A and FIG. 13B. FIG. 13A and FIG. 13B show patterns of random numbers that the same shift register 220 generates. FIG. 13A shows a pattern of random numbers resulting from initial values (1, 0, 0, 0, 0, 0, 0, 0), and FIG. 13B shows a pattern of random numbers resulting from initial values (0, 1, 0, 1, 0, 1, 0, 0).

As will be apparent from FIG. 13A and FIG. 13B, even in the same shift register circuit 220, when the initial values are different, the patterns of random numbers are different. In the random number generating circuit 200 shown in FIG. 9, random numbers are generated using the plural shift register circuits 220 in which different initial values are set, and the randomness of the random numbers that are generated from the random number generating circuit 200 improves. Further, the period of the random numbers that are generated can be lengthened by plurally mixing shift register circuits with different numbers of stages.

The randomness can be raised even with the same initial values by plurally mixing shift register circuits of different tap rows (combination of flip-flops that perform exclusive OR operation) in the shift register circuit of FIG. 12B.

Next, a problem in a case where the random number generating circuit 200 is formed using the plural shift register circuits 220 and a method of solving that problem will be described using FIG. 14 and FIG. 15.

Figure 14:
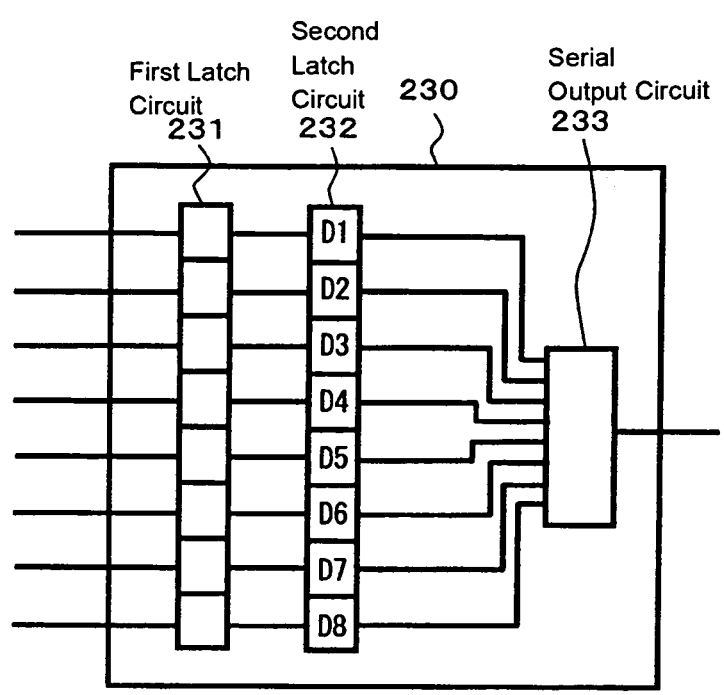
FIG. 14 is a general circuit diagram showing an output circuit of the random number generating circuit that is used in the liquid crystal display device of the invention.

In FIG. 14, the output of the shift register circuit 220 is held by a first latch circuit 231 and thereafter the data are held in a second latch circuit 232 and read from the second latch circuit 232 at a frequency of eight times the basic clock of the shift register circuit 220, whereby a serial signal is outputted from a serial output circuit 233.

Figure 15A:
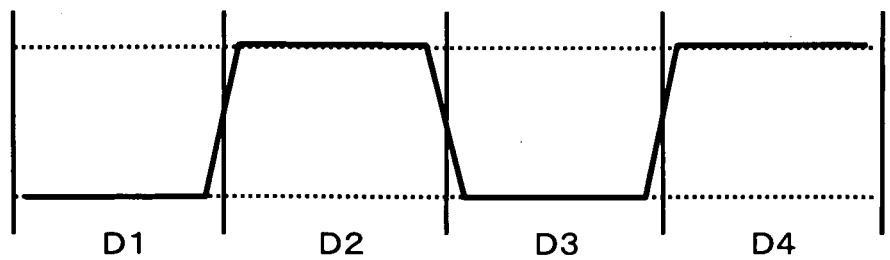
FIG. 15A, FIG. 15B and FIG. 15C are time charts describing an output waveform of the output circuit of the random number generating circuit that is used in the liquid crystal display device of the invention.
Figure 15B:
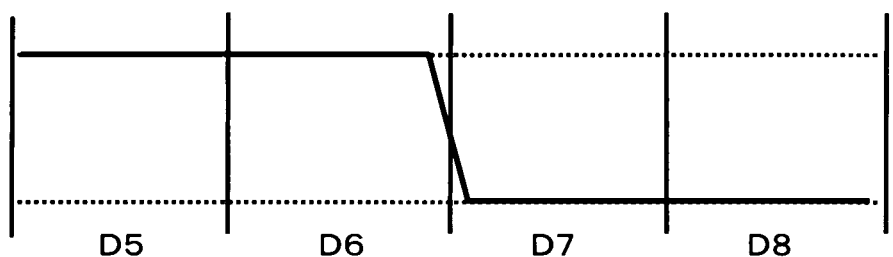
Figure 15C:
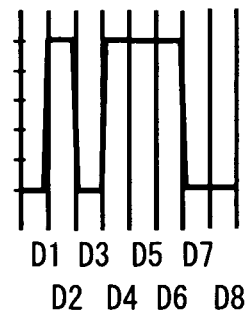

As shown in FIG. 15A and FIG. 15B, data D1 to D8 that were held in the second latch circuit 232 become a frequency of eight times as shown in FIG. 15C and are outputted from the serial output circuit 233. For example, even in a case where the transfer clock of the shift register circuit 220 synchronizes to the clock that transfers the display data, it becomes possible to output, from the serial output circuit 233, a signal at a frequency of eight times the display data-use transfer clock.

Even in a case where random numbers are generated using n number of the shift register circuits 220, randomness improves, but n number of different random numbers are generated. In this case, a number of random numbers greater than the number of random numbers that are actually utilized are generated, and those greater than the utilization number end up becoming needless.

For that reason, by disposing the output circuit 230 and outputting the random numbers as a serial signal of a frequency of n times, it becomes possible to utilize the outputted random numbers without waste.

Figure 16:
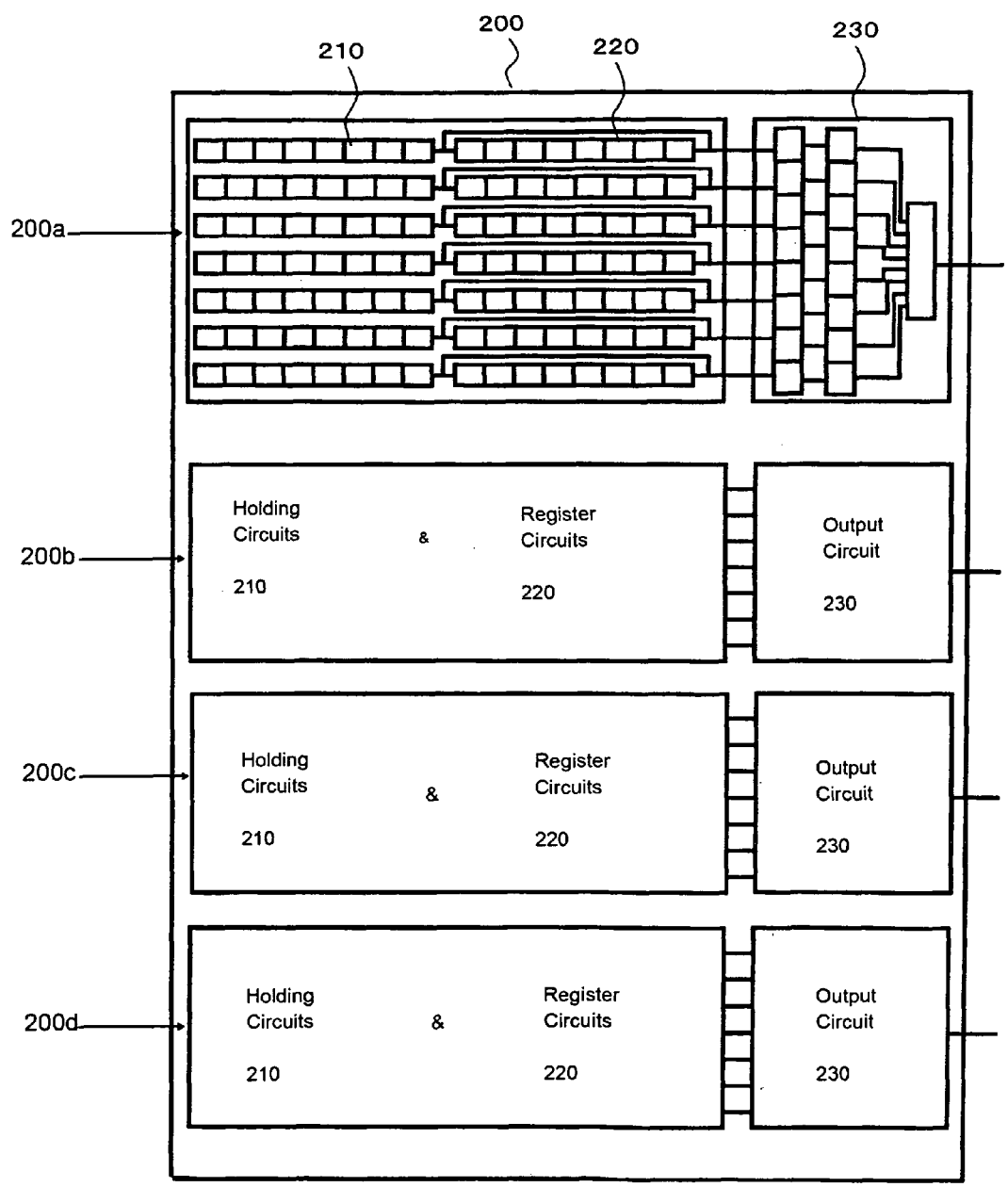
FIG. 16 is a general block diagram showing the random number generating circuit that is used in the liquid crystal display device of the invention.

Next, FIG. 16 shows a random number generating circuit 200 where four circuits 200a-d, each of which allows eight shift register circuits 220 to input to one output circuit 230, are arranged in parallel. In the random number generating circuit 200 shown in FIG. 16, randomness is improved and it also becomes possible to obtain plural random numbers.

Figure 17A:
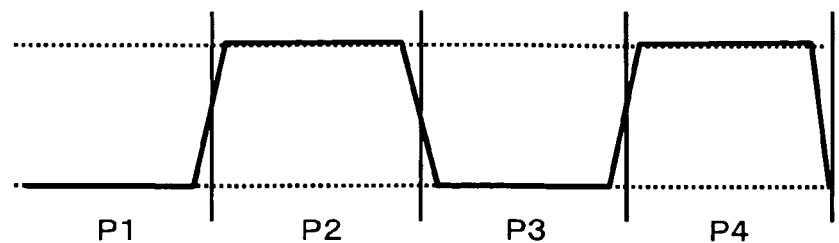
FIG. 17A and FIG. 17B are waveform diagrams showing an output radio wave of the random number generating circuit that is used in the liquid crystal display device of the invention.

Next, FIG. 17A shows an output waveform of the output circuit 230. There is considered, for example, a case where voltage change is continuous such that a low level signal is outputted at period P1 from the output circuit 230, a high level signal is outputted at period P2 and a low level signal is outputted at period P3.

Figure 17B:
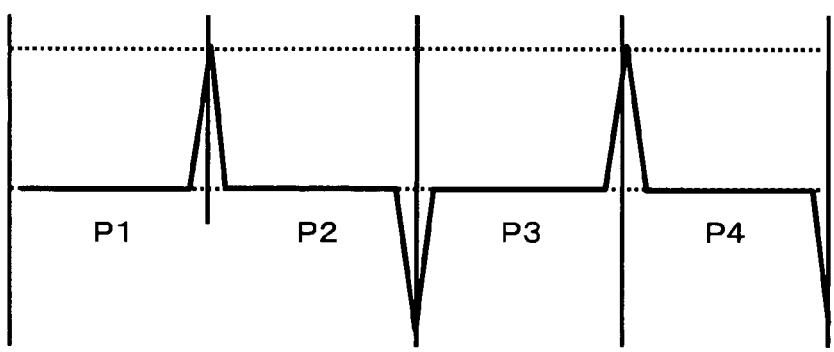

At the boundary between period P1 and period P2, a radio wave of a waveform such as shown in FIG. 17B is generated as radio wave noise because the voltage rises sharply. Conversely, even at the boundary between period P2 and period P3, a radio wave is generated because the voltage decreases sharply.

Figure 18:
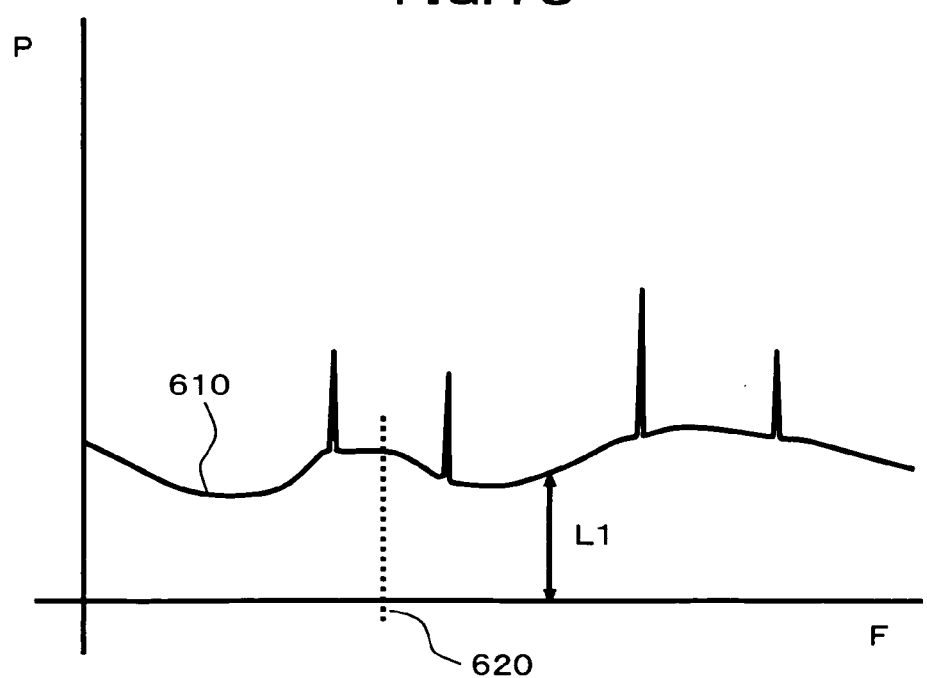
FIG. 18 is a frequency characteristic diagram showing the relationship between the frequency and the intensity of a radio wave that is generated from the liquid crystal display device of the invention.

Further, in the same manner as the output circuit 230, a radio wave is generated by the aforementioned digital signal 446 that is transferred between the graphic integrated circuit 451 and the control circuit 3. FIG. 18 shows one example of a measurement result of a frequency F and an intensity P of a radio wave 610 that is generated from the liquid crystal display device 100 by the digital signal 446 or the like. In FIG. 18, reference sign L1 represents the average intensity of the radio wave 610 that is generated from the liquid crystal display device 100.

It will be understood that noise is generated not only in a fundamental frequency 620 of the digital signal 446 but across the frequency overall. In the liquid crystal display device 100, usually the digital signal 446 is the display data and the fundamental frequency 620 is the frequency of the transfer clock of the display data, so the need to consider an EMI countermeasure arises.

Figure 19:
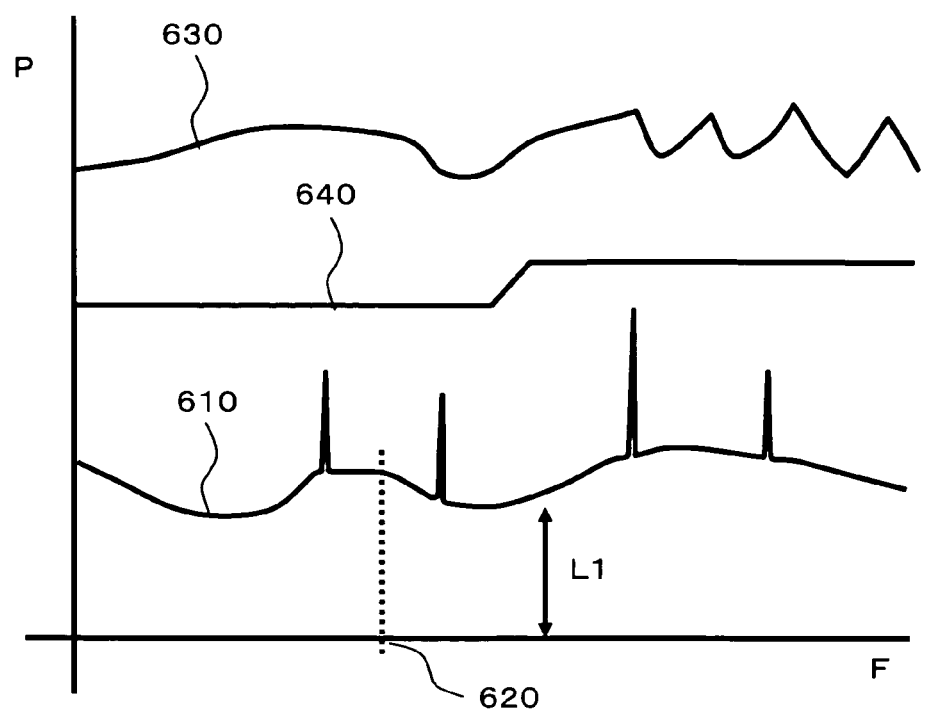
FIG. 19 is a frequency characteristic diagram showing the relationship between the frequency and the intensity of the radio wave, before a countermeasure, that is generated from the liquid crystal display device of the invention.

FIG. 19 shows the state of a generated radio wave 630 in a case where the transmission line 201 is disposed in the output circuit 230. The generated radio wave 630 resulting from the random number generating circuit 200 is larger than a limit radio wave intensity 640 of EMI and is of a level that becomes a problem as noise.

Figure 20:
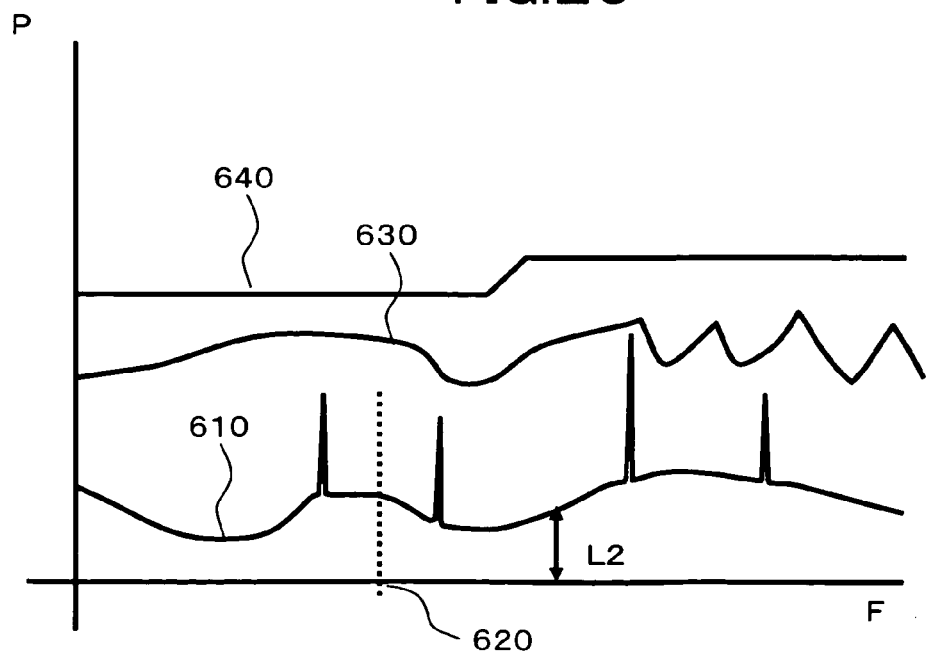
FIG. 20 is a frequency characteristic diagram showing the relationship between the frequency and the intensity of the radio wave that is generated from the liquid crystal display device of the invention.

In FIG. 20, by disposing a shield or the like, the radio wave 610 that is generated from the liquid crystal display device 100 is reduced and is made smaller than an average intensity L2. Moreover, the generated radio wave 630 resulting from the random number generating circuit 200 also becomes equal to or less than the limit radio wave intensity 640 of EMI.

Moreover, the generated radio wave 630 resulting from the random number generating circuit 200 is capable of covering the radio wave 610 that is generated from the liquid crystal display device 100 across the entire frequency band and is capable of preventing the radio wave 610 that is generated from the liquid crystal display device 100 from leaking to the outside.

The reason why it is possible for the generated radio wave 630 resulting from the random number generating circuit 200 to span the entire frequency band is because the randomness of the random number generating circuit 200 is high and it becomes possible for random numbers of a frequency domain of N times the fundamental frequency 620 to be generated. The reason why it is possible for random numbers of a frequency domain of N times the fundamental frequency 620 to be generated is because, even when the shift register circuits 220 are transferred at the fundamental frequency 620 of the digital signal 446, N number of the shift register circuits 220 are disposed and random numbers are outputted as a frequency of N times by the output circuit 230.

That is, it is possible to cover the band from the inverse frequency of a random sequence period to the fundamental frequency by generating a random sequence by a fundamental wave. Moreover, it becomes possible to expand the band that is covered to N times by outputting the random sequence in a frequency of N times the fundamental frequency.

Figure 21:
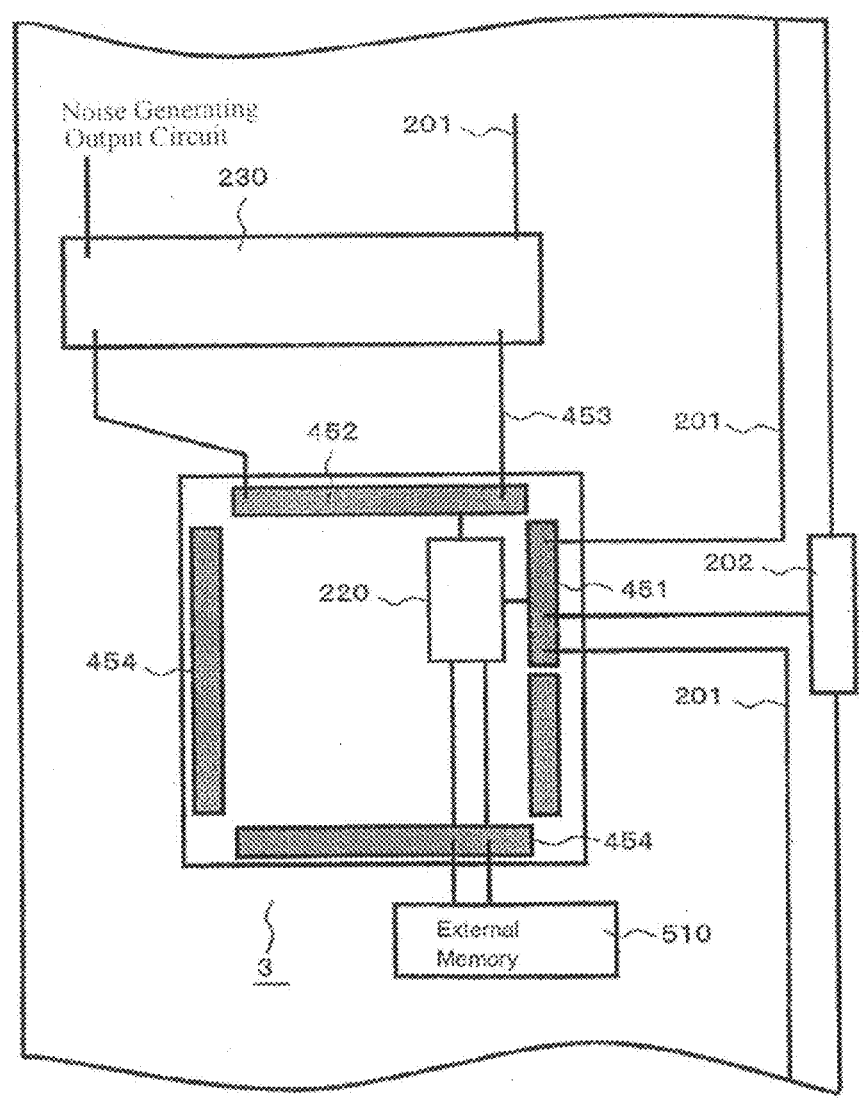
FIG. 21 is a general contour diagram showing a terminal arrangement of a control circuit of the liquid crystal display device of the invention.

Next, FIG. 21 shows a terminal arrangement in a case where the shift register circuit 220 is disposed in the control circuit 3 and the output circuit 230 is disposed outside the control circuit 3. Reference numerals 451 and 452 represent arrangement positions of terminals connected to the shift register circuit 220. The terminal that is arranged in the terminal position is connected to the output circuit 230, and a signal that has been inputted to the output circuit 230 is outputted from the output circuit 230 to the transmission line 201.

The transmission line 201 fulfills the role of an antenna, and it is possible to control the intensity of the generated radio wave 630 resulting from the random number generating circuit 200 by the shape and arrangement of the transmission line 201. It will be noted that it is possible to connect an attenuator or the like to the transmission line 201 when the intensity is to be attenuated.

The terminal in the terminal position 451 directly retrieves the output of the shift register circuit 220, and the output before its frequency is increased by the output circuit 230 is transmitted to the transmission line 201. The output before its frequency is increased it transmitted to the transmission line 201, whereby it is possible to output a radio wave widely on the low frequency side. That is, it is also possible to output a signal that is oscillated by the fundamental frequency to the transmission line 201.

Further, reference numeral 202 is a connector for external connection and is used for connection in a case where the transmission line 201 is disposed outside. The terminals represented by reference numerals 454 are used for connection to an external memory element 510 that stores the initial values, for example.

The invention that has been made by the present inventor has been specifically described above on the basis of the preceding embodiment, but the present invention is not limited to the preceding embodiment and may of course be variously altered in a range that does not depart from the gist thereof.

What is claimed is:

1. A display device comprising:
a display panel;
a drive circuit driving each pixel of the display panel; and
a control circuit outputting display data to the drive circuit,
wherein a random number generating circuit is disposed in the control circuit,
an output circuit n-multiplies the frequency of a pulse signal that the random number generating circuit has generated and outputs a serial random signal that has the n-multiplied frequency,
the output circuit includes n first latch circuits, n second latch circuits, and one serial output circuit, with n being an integer that is greater than one, and
wherein a radio wave intensity of the output circuit is larger than a radio wave intensity of the display data at a fundamental frequency of the display data so that the serial random signal covers a frequency band from an inverse frequency of a random sequence period to the fundamental frequency.

2. A display device according to claim 1, wherein the random number generating circuit includes n number of shift registers.

3. A display device according to claim 1, wherein the random number generating circuit includes a register that stores n number of initial values.

4. A display device according to claim 1, wherein the random number generating circuit includes n number of shift registers, and the shift registers synchronize to a transfer clock of the display data.

5. A display device comprising:
a display panel;
a drive circuit driving each pixel of the display panel;
a control circuit outputting display data to the drive circuit;
a random number generating circuit is disposed in the control circuit;
a memory element storing an initial value of the random number generating circuit; and
a noise generating output circuit to which a signal that the random number generating circuit has generated is inputted, the noise generating output circuit generating an n-multiplied frequency serial random signal from n number of pulse signals, the noise generating output circuit including n first latch circuits, n second latch circuits, and one serial output circuit, n being an integer that is greater than one, and wherein a radio wave intensity of the output circuit is larger than a radio wave intensity of the display data at a fundamental frequency of the display data so that the serial random signal covers a frequency band from an inverse frequency of a random sequence period to the fundamental frequency.

6. A display device according to claim 5, wherein the random number generating circuit includes n number of shift registers.

7. A display device according to claim 5, wherein the random number generating circuit includes a register that stores n number of the initial values.

8. A display device according to claim 5, wherein the random number generating circuit includes a register that stores n number of the initial values, and the initial values are transferred from the memory element to the register.

9. A display device according to claim 5, wherein the random number generating circuit includes n number of shift registers, and the shift registers synchronize to a transfer clock of the output data.

10. A display device comprising:
a display panel;
a touch panel being superposed on the display panel;
a drive circuit driving each pixel of the display panel;
a control circuit outputting display data to the drive circuit;
a random number generating circuit being disposed in the control circuit;
a memory element storing an initial value of the random number generating circuit; and
a noise generating output circuit to which a signal that the random number generating circuit has generated is inputted, wherein the noise generating output circuit generates an n-multiplied frequency serial random signal from n number of pulse signals, wherein the noise generating output circuit includes n first latch circuits, n second latch circuits, and one serial output circuit, n being an integer that is greater than one, and wherein a radio wave intensity of the noise generating output circuit is larger than a radio wave intensity of the display data at a fundamental frequency of the display data so that the serial random signal covers a frequency band from an inverse frequency of a random sequence period to the fundamental frequency.

11. A display device according to claim 10, wherein the random number generating circuit includes n number of shift registers.

12. A display device according to claim 10, wherein the random number generating circuit includes a register that stores n number of the initial values.

13. A display device according to claim 10, wherein the random number generating circuit includes a register that stores n number of the initial values, and the initial values are transferred from the memory element to the register.

14. A display device according to claim 10, wherein the random number generating circuit includes n number of shift registers, and the shift registers synchronize to a transfer clock of the output data.

* * * * *